3,475,344
PRODUCTION OF CATALYSTS CONTAINING COBALT
Karl Adam and Erich Haarer, Ludwigshafen (Rhine), Germany, assignors to Badische Anilin- & Soda-Fabrik Aktiengesellschaft, Ludwigshafen (Rhine), Germany
No Drawing. Filed June 14, 1966, Ser. No. 557,386
Claims priority, application Germany, June 19, 1965, B 82,472
Int. Cl. B01j 11/34
U.S. Cl. 252—432                               4 Claims

ABSTRACT OF THE DISCLOSURE

Catalysts containing cobalt, at least one of chromium and manganese, and polyacid anions are prepared by coprecipitating the catalyst components from solutions of the appropriate metal salts and acids which are convertible into polyacids and selected from the group consisting of phosphoric acid, boric acid, titanic acid, vanadic acid, molybdic acid and tungstic acid. The catalyst components are coprecipitated by adding caustic alkali solutions or alkali metal carbonate solutions. The catalysts are useful for the production of amines from alcohol.

---

This invention relates to a method of producing catalysts containing cobalt, particularly those which are suitable for aminating alcohols.

It is known from U.S. patent specifications No. 3,232,888 that hydrogenation catalysts containing cobalt may be prepared which contain as activators chromium and/or manganese and pyroacids or polyacids, the acids required for the formation of the pyroacids being added in free form to the mixture of catalyst components or to the metal salt solution used for impregnating the carrier. Although these catalysts are very active and are also suitable for the production of amines from alcohols and ammonia, they have only a limited life because their mechanical stability is not very great.

It is an object of this invention to provide catalysts which are produced by a special method. Another object is to provide a catalyst which is suitable for the production of amines from alcohols. Further it is an object of the invention to provide a catalyst which has high mechanical stability and a long life.

We have found that catalysts which contain cobalt as well as chromium and/or manganese and pyroacid anions or polyacid anions, with or without other metallic activators, having very high mechanical stability and consequently long life are obtained by coprecipitating all the components of the catlaysts from solutions of the corresponding metal compounds and the acids which are convertible into pyroacids or polyacids, used for the production of the catalyst, by adding caustic alkali solution or alkali metal carbonates solution, particularly sodium hydroxide solution or sodium carbonate solution, converting the resultant mixture by heating into a composition containng mainly oxides, advantageously shaping the composition and if desired reheating it.

The term "polyacids" as used in this specification includes "pyroacids." A definition of polyacids which explains that this term includes pyroacids will be found for example in Ephraim, "Inorganic Chemistry," 4th edition, pages 500 to 501 (1943). It may be regarded as known that polyacids are formed by heating the equivalent pyroacids with elimination of water and condensation.

The new catalysts are outstandingly suitable for the reaction of alkanols with ammonia in the presence of hydrogen to form the corresponding amines. They have the further advantage that they give purer products than prior art catalysts.

Aqueous solutions of the corresponding metal compounds and the acids which are convertible in pyroacids or polyacids are used for the production of the catalysts. The metal compounds are in general metal salts in which the metals in question are present as the cation. Acids derived from the metals, such as chromic acid, or salts thereof may however also be used. Examples of suitable cobalt compounds are cobalt nitrate, cobalt acetate, cobalt sulfate and cobalt chloride. Examples of chromium compounds are chromic acid, chromium sulfate, chromium nitrate, chrmoium chloride and sodium dichromate. Examples of manganese compounds are manganese nitrate, manganese acetate, manganese sulfate nad manganese chloride. Examples of metallic activators which my be used in addition to chromium and/or manganese are silver, zinc, nickel and ruthenium. The nitrates, chlorides, acetates and sulfates are examples of compounds of these metals which are suitable for the production of the catalysts.

All acids which when heated to elevated temperature, for example 350° to 700° C., change into their pyro or poly form, for example phosphoric acid, boric acid or metal acids, such as titanic acid, vanadic acid, molybdic acid or tungstic acid, may be used as pyroacid or polyacid forming components. It is preferred to add phosphoric acid, boric acid or vanadic acid. The acids may be used for example as free acids, their water-soluble salts or as anhydrides for the preparation of the aqueous solutions.

The individual metal compounds and acids forming pyroacids or polyacids are used in such proportions that the cobalt fraction is 70 to 98% by weight (calculated as metal), the manganese and/or chromium fraction is 0.07 to 10% by weight (calculated as metal), particularly 1 to 5% by weight, the fraction of any other metallic activators present is 0.1 to 3% by weight (calculated as metal) and the pyroacid or polyacid fraction is 0.01 to 10%, particularly 1 to 5%, by weight (calculated as acid or in the case of metal acids calculated as metal), all percentages being with reference to the whole of the catalyst.

Aqueous solutions in which the individual metal compounds or acids are present in concentrations of 25 to 50% by weight are usually used in the process. The solutions are first united in the acid range, for example in the pH range of 1 to 2. A mixture of metal oxides, hydroxides or carbonates together with the acid constituents is then precipitated by means of aqueous alkali hydroxide solution, particularly of 10 to 25% by weight strength, or aqueous alkali metal carbonate solution, preferably having a concentration of 5 to 25% by weight. It is preferred to use caustic soda solution, caustic potash solution, sodium carbonate solution or potassium carbonate solution for the precipitation. It is also possible to allow the metal compounds to flow into the alkaline solution of the precipitant. It is advantageous to correlate the relative proportions of acid solution and alkaline precipitant so that a pH value of 7.2 to 7.5 is set up in the reaction mixture. The precipitated mixture of oxides, hydroxides and/or carbonates is filtered off, washed free from extraneous salts with water and dried. Any hydroxides or carbonates are then converted into the equivalent oxides by heating. Temperatures of 250° to 500° C. are in general sufficient.

After the mixed catalysts have been made into a paste, for exmaple with water, they may be shaped for example into strands or pellets. These shaped articles are advantageously heated again to 300° to 800° C., particularly 400° to 600° C.

The new catalysts are used for the amination of alcohols to amines under conditions known for example from Houben-Weyl "Methoden der organischen Chemie," 4th edition, volume XI, part 1, pages 126 to 134, for the reactants therein specified. These (i.e. alcohol and ammonia) are heated in the presence of the catalysts to the reaction temperature. The volumetric ratio of alcohol to ammonia or amine is advantageously from 1:1 to 1:20, particularly at about 1:10, the reaction temperature from 150° to 250° C., particularly 180° to 200° C. It is advantageous to have hydrogen present and to use superatmospheric pressure, mainly 200 to 400 atmospheres. Prior to the reaction, the catalyst is converted at least partly into the metallic state by heating to 200° to 400° C., advantageously 250° to 360° C., in the presence of hydrogen.

The invention is illustrated by the following examples.

EXAMPLE 1

4480 g. of cobalt nitrate ($Co(NO_3)_2 \cdot 6H_2O$), 261 g. of manganese nitrate ($Mn(NO_3)_2 \cdot 6H_2O$) and 47 g. of phosphoric acid (85%) ($H_3PO_4$) are dissolved in 10 liters of water and allowed to flow slowly into a solution of 1900 g. of sodium carbinate ($NaCO_3$) in 10 liters of water while stirring. After all the metal salt solution has been added, the precipitated mixture is worked up. The pH value of the mixture has fallen to 7.0. After cooling, the precipitate is separated by suction filtration adn washed in water until the filtrate is free from sodium ions. The filter cake is dried in a drying cabinet and then heated at 300° C. until the composition is free from carbonate. The oxide mixture is made into a paste with such an amount of water that a kneadable product is formed which is shaped into strands in a press. The strands are annealed at 450° C. in a muffle furnace for twenty-four hours.

A cobalt-chromium catalyst may be obtained in the same way by using 98 g. of chromium trioxide for the production of the catalyst instead of manganese nitrate.

EXAMPLE 2

240 liters of a catalyst prepared in the way described in Example 1 is placed in a reactor 200 x 8000 mm. and reduced with hydrogen at 300° C. 78.5 kg. per hour of isopropanol, 180 liters per hour of liquid ammonia and 50 cubic meters (STP or recycled off-gas are passed over the catalyst at 220° C. and a hydrogen pressure of 300 atmospheres. The reaction mixture obtained is freed from ammonia. 77.1 kg. of crude isopropylamine is obtained. By distillation, 71 kg. of pure isopropylamine and 5 kg. of diisopropylamine are obtained therefrom.

The activity of the catalyst is unchanged even after it has been used for six months.

EXAMPLE 3

50 liters of the catalyst described in Example 1 is placed in a reactor 120 x 5000 mm. The reduced catalyst is loaded with 4.04 kg. of phenyl ethyl alcohol and 28 liters of liquid ammonia per hour. The temperature is 220° C., the hydrogen pressure is 300 atmospheres, and 10 cubic meters (STP) of the off-gas is recycled. 4 kg. of crude amine free from ammonia gives 3.6 kg. of pure phenylethylamine and 0.34 kg. of diphenylethylamine when distilled.

We claim:
1. A process for the production of catalyst containing cobalt, at least one member selected from the group consisting of chromium and manganese and a polyacid anion which comprises coprecipitating all the components of the catalyst from a solution containing the corresponding salts of the aforesaid metals and an acid selected from the group consisting of phosphoric acid, boric acid, titanic acid, vanadic acid, molybdic acid and tungstic acid by adding to said solution a member selected from the group consisting of caustic alkali solutions and alkali metal carbonate solutions, said salts and said acid being used in such proportions that the cobalt fraction is 70 to 98% by weight, calculated as metal, the fraction of said group of manganese and chromium is 0.07 to 10% by weight, calculated as metal, and the acid fraction is 0.1 to 10% by weight, calculated as acid or in the case of metal acids calculated as metal, and heating the resultant precipitate to convert it into a catalyst composition containing mainly oxides.

2. A process as claimed in claim 1 wherein the precipitant is caustic soda solution or sodium carbonate solution.

3. A cobalt-containing catalyst which contains at least one of chromium and manganese and polyphosphoric acid produced by the process as claimed in claim 1.

4. A process as claimed in claim 1, and reducing said composition containing mainly oxides with elementary hydrogen to a catalyst composition which contains at least in part cobalt metal and at least one of manganese or chromium metal.

References Cited

UNITED STATES PATENTS

| | | | |
|---|---|---|---|
| 3,232,888 | 2/1966 | Adam | 252—435 |
| 2,152,473 | 3/1939 | Griffith | 23—3.1 |
| 2,793,241 | 5/1957 | Fawcett | 260—682 |

PATRICK P. GARVIN, Primary Examiner

U.S. Cl. X.R.

252—434, 435, 437, 467, 469, 470, 471; 260—585, 570.8